No. 852,543. PATENTED MAY 7, 1907.
H. E. DECKEBACH.
APPARATUS FOR PURIFYING, COOLING, AND DRYING AIR.
APPLICATION FILED JAN. 23, 1907.
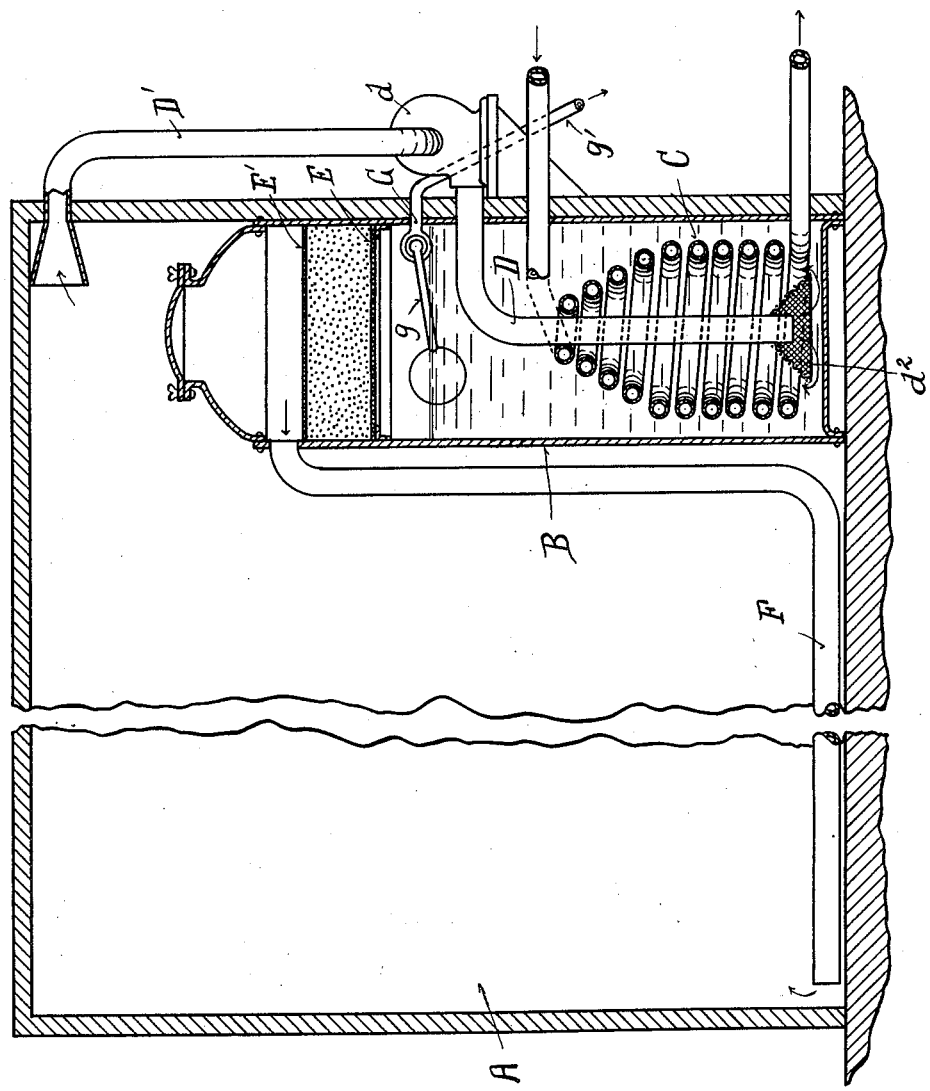
Witnesses
A. McCormack.
Ozelia Prather.
Inventor
Henry E. Deckebach
By Walter F. Murray
Attorney

UNITED STATES PATENT OFFICE.

HENRY E. DECKEBACH, OF CINCINNATI, OHIO.

APPARATUS FOR PURIFYING, COOLING, AND DRYING AIR.

No. 852,543.   Specification of Letters Patent.   Patented May 7, 1907.

Application filed January 23, 1907. Serial No. 353,607.

*To all whom it may concern:*

Be it known that I, HENRY E. DECKEBACH, a citizen of the United States of America, and a resident of Cincinnati, county of Hamilton, State of Ohio, have invented certain new and useful Improvements in Apparatus for Purifying, Cooling, and Drying Air, of which the following is a specification.

It is the purpose of my invention to provide a means for supplying air in a cooled, dried and purified state to a room, which is especially adapted for use in rooms wherein fresh meat is hung. In these rooms it has been observed that there is a great deal of moisture arising from the meats, especially where they are fresh, due to the presence of animal heat therein. In these rooms, where the cooling is effected by cooling fluids passed through pipes, this moisture becomes condensed and frozen upon the pipes frequently to a great thickness.

With my invention the air is withdrawn from these rooms, and purified, cooled, dried, and then returned to them. During this process the air likewise in my apparatus is placed in a state such that its action upon the fresh meats is to render them less liable to infection.

In the drawing I have illustrated a vertical sectional view through my apparatus and through a room supplied therewith, the room being shown partly cut away and the ends being brought together to economize space.

At one end of the room, A, is located a cylindrical receptacle, B, upon whose bottom is situated a coil of pipe, C. Coil, C, is in the form of a pyramidal housing, the coils being closely wound so as to leave narrow interstices between the coils. The upper and lower end of the coil, C, extend through the walls of the receptacle, B, and through them a cooling fluid, such as ammonia, is directed. Vertically through the center of coil, C, extends a pipe, D, whose upper end is connected to a pump, $d$, into which a pipe, D', leads from the upper part of the room, A. The lower end of pipe, D, where it opens into the bottom of receptacle, B, has a conical screen, $d^2$.

Above coil, C, are located two perforated shelves, E and E'. Above shelf, E', an air pipe, F, leads to the bottom of the room, A, at the opposite end from that in which the receptacle, B, is situated.

Below shelf, E, is a discharge pipe, G, the opening of whose end within the receptacle, B, is controlled by a float-valve, $g$, and whose outer end leads to a waste pipe, $g'$.

Within the bottom of receptacle, B, a solution, preferably of calcium chlorid is placed, so as to cover the coil, C. Between the shelves, E, and E', crystals of calcium chlorid are placed. The calcium chlorid in the liquid in the bottom of the receptacle has the effect of keeping the liquid from freezing, although the ammonia passing through coil, C, may lower the temperature below that of the freezing point of water.

Pump, $d$, draws the air from the top of the room and forces it down through pipe, D, from which it is discharged at the bottom of the receptacle, B. Screen, $d^2$, disperses the air somewhat as it arises throughout the housing formed by the coil, C. The air then passes through the interstices between the coils, being thereby brought into intimate contact with the coils containing the cooling fluid and is thereby lowered greatly in its temperature. The housing formed by the coil likewise has the effect of reducing or dispersing the force of the upward rise of the air through the fluid, so that the bubbling at the surface of the fluid is lessened. In passing through the fluid, the air is both cooled and purified. When it leaves the fluid, it has a certain amount of moisture. It then rises through the perforations in the plate, E, which has the effect of dispersing the air through all parts of the crystals of calcium chlorid held between the two shelves. In its passage through the crystals of calcium chlorid the air is dried, and likewise further purified, passing from the receptacle, B, by pipe, F, to the opposite end of the room in a cold, purified and dry state.

The moisture taken up by the calcium chlorid between shelves, E and E', dissolves some of the salt and this concentrated solution falls through the perforations in the shelf, E, into the solution held in the receptacle, B. The impurities in the solution, B, rise to the top thereof. The solution falling from the shelf, E, causes the fluid to rise in the receptacle, B, and to open the float-valve, $g$, the impurities upon the surface of the fluid then passing through the valve, G, to the drain pipe, $g'$.

What I claim is:

1. In an air cooling and purifying apparatus the combination of a receptacle holding a solution of a salt which has the property of absorbing moisture from the air, a means for cooling the solution, a perforated shelf located in the receptacle and holding the salt above the solution thereof, a pipe leading in to the bottom of the receptacle and connected to the pump, the pump, and a second pipe leading from the top of the room into the pump.

2. In an air cooling and purifying apparatus the combination of a receptacle holding the solution of a salt which has the property of absorbing moisture from the air, a pipe carrying a cooling liquid and coiled so as to leave interstices between the coils and forming a housing situated upon the bottom of the receptacle, an air pipe leading into the housing formed by the coils, a pump connected to the pipe, a perforated shelf located in the receptacle and holding the salt above the solution.

3. In an air cooling and purifying apparatus the combination of a receptacle holding a solution of calcium chlorid, a means for cooling the solution, a perforated shelf located in the receptacle and holding the salt of calcium chlorid above the solution, an air pump, and a pipe leading from the pump in to the bottom of the receptacle.

4. In an air cooling and purifying apparatus the combination of a receptacle holding a solution of calcium chlorid, a means of cooling the solution, a perforated shelf in the receptacle holding calcium chlorid above the solution thereof, a pump, an air pipe leading from the pump in to the bottom of the receptacle and a drain pipe located in the receptacle below the perforated shelf.

HENRY E. DECKEBACH.

Witnesses:
WALTER F. MURRAY,
AGNES McCORMACK.